(12) United States Patent
Edge

(10) Patent No.: US 6,597,916 B2
(45) Date of Patent: Jul. 22, 2003

(54) HYBRID ARCHITECTURE FOR SUPPORTING LOCATION DETERMINATION IN A WIRELESS NETWORK

(75) Inventor: Stephen William Edge, Escondido, CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 13 days.

(21) Appl. No.: 10/032,888

(22) Filed: Dec. 26, 2001

(65) Prior Publication Data

US 2003/0119526 A1 Jun. 26, 2003

(51) Int. Cl.⁷ .................................................. H04Q 7/20
(52) U.S. Cl. ....................... 455/456; 455/404; 455/445; 455/67.1
(58) Field of Search ................................. 455/404, 456, 455/457, 445, 466, 422, 426, 437–440, 560, 561, 67.1, 67.3; 342/357.1

(56) References Cited

U.S. PATENT DOCUMENTS 5,960,341 A * 9/1999 LeBlanc et al. ............. 455/456
6,002,936 A * 12/1999 Roel-Ng et al. ............. 455/456
6,463,287 B1 * 10/2002 Wegner ....................... 455/456

\* cited by examiner

*Primary Examiner*—Lester G. Kincaid

(57) ABSTRACT

A hybrid system and method are provided for determining the geographic location of a wireless device. A first base station subsystem is connected to the wireless device for transferring location information to and from the wireless device. A network subsystem is connected to the first base station subsystem and to a location computation entity for transferring location information between the first base station subsystem and the location computation entity. A second base station subsystem is connected to a location measurement entity and to the location computation entity for transferring location information between the location measurement entity and the location computation entity. The location computation entity generates and sends location information to the wireless device and/or location measurement entity and processes location information received from the wireless device and/or location measurement entity to obtain the geographic location of the wireless device.

21 Claims, 5 Drawing Sheets

HYBRID ARCHITECTURE FOR SUPPORTING LOCATION DETERMINATION IN A WIRELESS NETWORK

BACKGROUND OF THE INVENTION

1. Field of the Invention

The present invention relates to the determination of the location of a wireless device. More particularly, the present invention relates to the determination of the location of a wireless device with a hybrid system and method that utilizes BSS and NSS subsystems of a wireless communications network.

2. Description of Related Art

Determination of the precise geographic location of a wireless device, such as a cellular phone or personal communications services (PCS) device for example, is a capability that is now being developed and standardized for today's PCS, cellular and satellite based wireless networks. Deployment of this capability is required, for example, in the US to fulfill the FCC's phase 2 requirements for E911 calls. Known strategies to obtain a geographic location typically employ either (a) an overlay solution in which the entities that perform location measurement and location computation are external to the wireless communications network and communicate using external or externally available transmission and switching capabilities or (b) an integrated solution in which these entities form part of the wireless network and make use of communication capabilities provided within the network.

A typical terrestrial wireless communications network (for example cellular or PCS) consists of three major subsystems: the Base Station Subsystem (BSS), Network Sub-System (NSS) and Operations and Maintenance Subsystem (OMS). Wireless communication networks are typically categorized into "generations" according to the technology being implemented. For example, the generation of a particular wireless technology is now commonly accepted in the art with first generation corresponding to systems supporting an analog radio interface (e.g. AMPS), second generation supporting a digital radio interface with a peak bit rate for any application of around 64 kbps (e.g. GSM, PCS1900, CDMA IS-95, TDMA) and third generation supporting a peak bit rate for applications of at least 384 kbps (e.g. CDMA2000, WCDMA).

In many existing first and second generation wireless technologies (e.g. GSM, CDMA IS-95, TDMA, AMPS), the BSS includes logically or physically distinct entities to serve as a Base Station Controller (BSC), Base Station Transceiver Station (BTS) and a Transcoding and Rate Adaptation Unit (TRAU). Logically distinct units may be physically supported on a common hardware platform while retaining their distinct functions. The NSS contains logically or physically distinct entities to serve as a Mobile Switching Center (MSC), Visitor Location Register (VLR), Home Location Register (HLR), Authentication Center (AC), Equipment Identification Register (EIR). The functions of these different entities are known to those of ordinary skill in the art of wireless networks. In simple terms, the BSS manages the radio aspects of the network whereas the NSS manages mobility, call control and supplementary services (e.g. call forwarding, short message service). For second generation systems supporting packet data communication—e.g. General Packet Radio Service (GPRS)—other entities are included in the NSS such a Serving GPRS Support Node (SGSN) and Gateway GPRS Support Node (GGSN). For third generation systems, entities are further modified and/or new ones are introduced in the NSS and BSS. The constituents of the BSS and NSS for third generation systems are subject to future developments in technology and standards.

Typical models of a geographic location service in a wireless network (e.g. as being deployed for FCC E911 phase 2) assume that some external user, sometimes termed a "client", interacts with the wireless network to obtain the geographic location of a Wireless Mobile Subscriber (MS, or "wireless device") either on demand or when some predetermined event occurs (e.g. the origination of an E911 call). The wireless network then instigates the procedures that will lead to a geographic location estimate for the particular MS.

In order to obtain an accurate geographic location for an MS, radio related measurements must generally be taken involving either (or in some cases both of) the uplink radio transmission from the MS or (and) downlink radio transmission to the MS. The resulting measurements, normally made over a short time period (e.g. a few milliseconds to a few seconds), then form the input to a computational algorithm from which a geographic position (e.g. latitude and longitude coordinates) is produced.

Examples of existing positioning methods include Time Of Arrival (TOA), Time Difference Of Arrival (TDOA), Angle of Arrival (AOA), Timing Advance (TA), Observed Time Difference (OTD), Enhanced Observed Time Difference (EOTD), Observed Time Difference Of Arrival (OTDOA), Global Positioning System (GPS). These methods can be allocated among the following categories (in some cases with different variants of the same method appearing in more than one category):

(a) Network Based (e.g. TOA, TDOA, TA, AOA)—measurements of uplink MS radio transmissions are made by the network with position computation in the network.

(b) Mobile Assisted (e.g. OTD, E-OTD, OTDOA, GPS)—measurements of downlink radio transmission (emanating from the wireless network or from other sources like GPS satellites) are made by the MS. These measurements are then provided to the network where position computation occurs.

(c) Mobile Based (e.g. OTD, E-OTD, OTDOA, GPS)—measurements of downlink radio transmission (emanating from the wireless network or from other sources like GPS satellites) are made by the MS. Position computation using these measurements is then also performed by the MS.

In order to support the above categories, two special functional entities are required in addition to those already existing in the wireless network and MS: a location measurement entity (LME) to perform radio related measurements and a location computation entity (LCE) to compute a geographic location estimate from the measurements provided by the LMEs. These terms are generic and correspond to certain more specific entities in particular wireless technologies. Thus, for example, the LCE can correspond to both the Positioning Determining Entity (PDE) used in ANSI-41 based networks (e.g. TDMA, CDMA IS-95) and the Serving Mobile Location Center (SMLC) defined for GSM and PCS1900 networks. Similarly, the LME can correspond to the radio elements of a Positioning Determining Entity (PDE) in ANSI-41 networks and to the Location Measurement Unit (LMU) defined for PCS1900 and GSM networks. Further, the LME typically may be accessed using only wireline facilities or may be accessed by wireline and wireless means (e.g. RF, microwave) including wireless access similar to or the same as that supported for normal MSs within the wireless network.

One known architectural solution for communicating geographic location information between the LCE and the LME and/or MS is known as an "NSS solution". The LCE is typically attached and directly accessible only to the NSS. Disadvantageously, this architecture relies on the NSS to support signaling between the LCE and both the LME and MS. Thus, any hardware and/or software limitations and failures in the NSS can negatively impact the timely and accurate flow of information. There may also be signaling limitations in the NSS that restrict the volume of data that can be transferred between an LCE and an LME and between an LCE and an MS per unit of time, resulting in a limitation on the number of location attempts that can be performed per unit of time. This limitation may also produce increased delay for location attempts that do succeed due to the extra signaling delays in the NSS plus any queuing delay when signaling throughput limits are reached. An example of a location application for which these limitations may be significant is "home zone billing"—a service in which an MS subscriber is billed at a special (e.g. flat or reduced) rate when making or receiving calls within a predefined home zone area. To verify whether the MS actually is within the home zone area, a wireless network would need to perform at least one location determination for every incoming and outgoing call and possibly additional location determinations at periodic intervals during a call or when a call is handed over from one BSS cell site to another. Such a service implies several location determinations per subscriber per hour during peak busy periods. The ensuing signaling load in the NSS would then be heavy particularly if a network based positioning method was being used where several LMEs need to send measurements related to the location of the MS through the NSS to the LCE for each attempt to locate an MS.

Another known architectural solution for communicating geographic location information between the LCE and the LME and/or MS is known as a "BSS variant" or "BSS solution". The LCE is typically attached and directly accessible only to the BSS. LME to LCE signaling (to transfer measurements from the LMEs to the LCE) and LCE to MS signaling (to support mobile based and mobile assisted position methods) are then both supported by signaling facilities in the BSS only. Disadvantageously, access by the NSS to the LCE (e.g. to initiate a location procedure and receive the resulting location estimate) needs to go through intermediate signaling facilities in the BSS—i.e. is less direct than with an NSS solution. This can negatively impact the timely and accurate flow of information that enable access to the LCE from the NSS for any location application in which the client is supported within or by the NSS.

SUMMARY OF THE INVENTION

It is an object of the invention to provide a hybrid system and method for determining the location of a wireless device.

It is another object of the invention to provide a system and method for determining the location of a wireless device with fewer throughput limitations and delays than known NSS solutions.

It is another object of the invention to provide a system and method for determining the location of a wireless device while avoiding some throughput limitations and delays of known BSS solutions.

The present invention is applicable to both an integrated and overlay solution. A hybrid system and method of location determination is utilized in which the location determination functionality is provided in part by the BSS and in part by the NSS. Advantageously, the division of functionality among the BSS and NSS can reduce network infrastructure impacts and improve performance compared to either a pure BSS or pure NSS approach.

With the hybrid architecture, LME to LCE signaling does not rely on signaling capability in the NSS and does not overburden the signaling facilities in the NSS. Although in a preferred embodiment MS to LCE signaling still relies on signaling facilities in the BSS and NSS, as in the NSS based architecture, the volume of such signaling will be substantially zero for network based positioning methods (where there is no MS to LCE signaling). With regard to the MS based or MS assisted positioning support by the hybrid architecture, while there is additional signaling through the NSS to support MS to LCE signaling, in a preferred embodiment there is no extra signaling through the BSS to enable access to the LCE from the NSS. Advantageously, software and/or hardware impacts in the BSS are not needed to support NSS access to the LCE.

The hybrid location services architecture can support location of MS subscribers in a wireless network and can be used in conjunction with any network based, mobile assisted and mobile based position methods.

DETAILED DESCRIPTION

For the purposes of this disclosure, the term BSS means Base Station Subsystem, which is a wireless network subsystem, including its associated, switching, transmission and processing capabilities that manages the radio interface support for mobile subscribers and the transfer of control and user signaling information over this interface. The term NSS means Network SubSystem, which includes the switching, transmission, processing and database facilities that provide support for mobility, call control, supplementary services, messaging services, subscription and access to other wireless and wireline networks.

Figure 1:
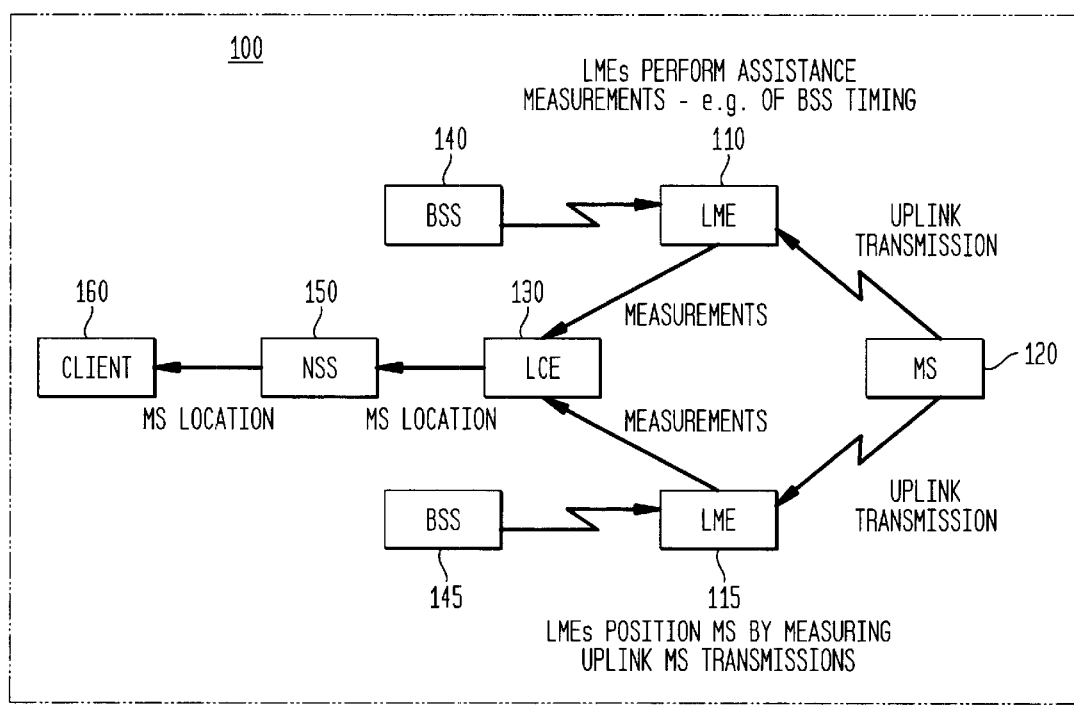
FIG. 1 is a diagram representing an example of LCE and LME roles for network-based position methods.

With reference to FIG. 1, architecture diagram 100 illustrates the interaction of some components used in a network-based positioning system. LMEs 110, 115 perform measurements involving uplink radio transmissions from MS 120. LMEs 110, 115 may also perform measurements not directly related to any one particular MS to obtain additional information for LCE 130. Examples of such additional measurements include measurements of the relative timing differences between the downlink transmissions from different BSS cell sites 140, 145 and measurements of the correspondence of the downlink transmission timing at a particular BSS cell site 140 or 145 with some source of absolute time like GPS satellites (not shown).

All relevant measurements—including those for a particular MS and those independent of any MS—are supplied by LMEs 110, 115 to LCE 130, where a location estimate is obtained for each MS being measured. This location estimate may then be transferred from LCE 130 to client 160 via NSS 150. In an alternative preferred embodiment, the location is transferred from LCE 130 to client 160 directly, without going through NSS 150.

Figure 2:
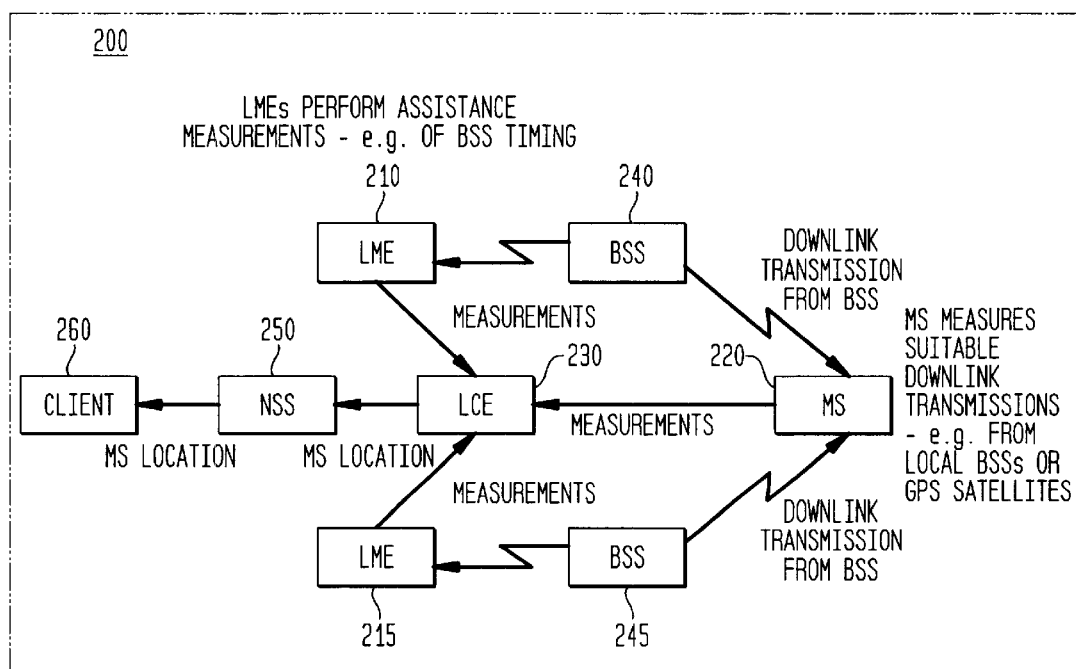
FIG. 2 is a diagram representing an example of LCE and LME roles for mobile-assisted position methods.

With reference to FIG. 2, architecture diagram 200 illustrates the interaction of some components used in a mobile-assisted positioning system. MS 220 makes measurements of suitable downlink radio transmissions, e.g. from local BSSs 240, 245 or from GPS satellites (not shown) and provides these to LCE 230. LMEs 210, 215 may be utilized to provide additional measurements to LCE 230 to assist with computation of a location estimate for MS 220 by LCE 230 and/or to provide information that may be sent to MS 220 to assist with the downlink radio measurements. For example, in a preferred embodiment LME 210 functioning as a GPS receiver provides LCE 230 with-GPS-related measurements and information that, following further processing in LCE 230, are sent to MS 220 (e.g. in the form of ephemeris or almanac data) to enable faster and more accurate GPS measurements by MS 220. Location data may be transferred from LCE 230 to client 260 via NSS 250. In an alternative preferred embodiment, the location is transferred from LCE 230 to client 260 directly, without going through NSS 250.

Figure 3:
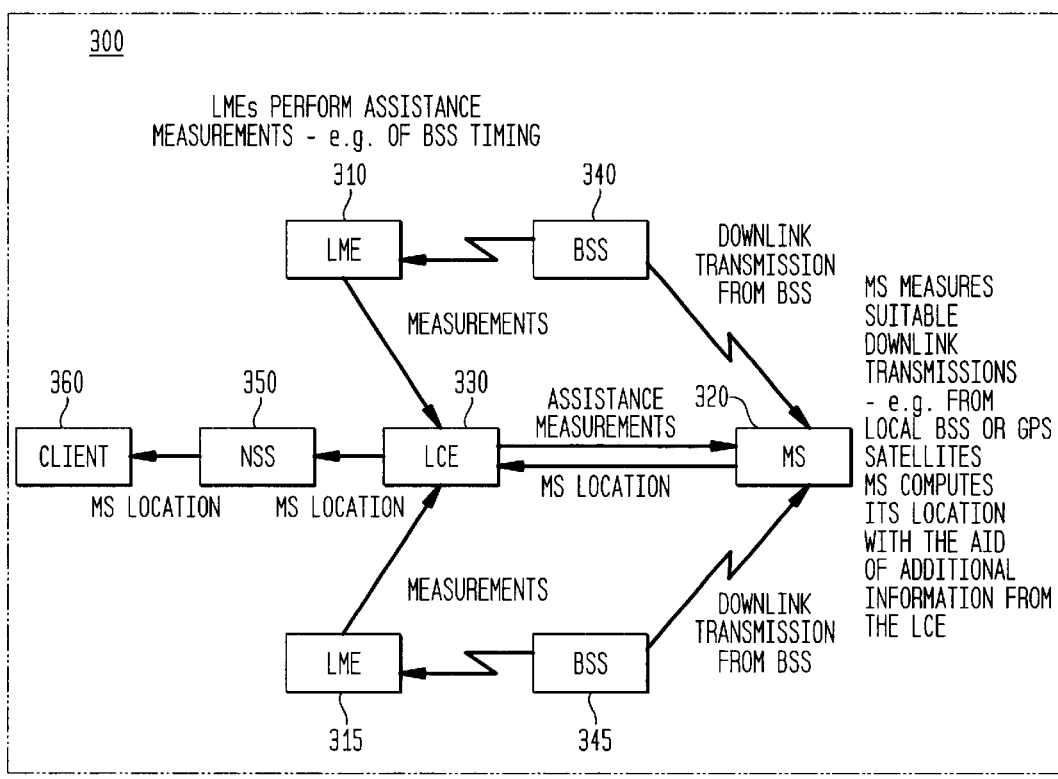
FIG. 3 is a diagram representing an example of LCE and LME roles for mobile-based position methods.

With reference to FIG. 3, architecture diagram 300 illustrates the interaction of some components used in a mobile based positioning system. With MS based position methods, MS 320 makes measurements of suitable downlink radio transmissions as with MS assisted methods illustrated in FIG. 2. In a preferred embodiment, LMEs 310, 315 may provide additional information to MS 320 by making additional measurements and transferring these to LCE 330 for possible further processing and subsequent transfer to MS 320. MS 320 then computes its own location using its own measurements and any additional information supplied by LCE 330 and provides the computed location to LCE 330. This computed location may then be transferred to client 360 via NSS 350. In an alternative preferred embodiment, the location is transferred from LCE 330 to client 360 directly, without going through NSS 350.

With each of the three types of position methods illustrated in FIGS. 1–3, signaling paths are required between LCE (130; 230; 330 respectively) and LMEs (110, 115; 210, 215; 310, 315 respectively) and between the LCE (130; 230; 330 respectively) and MS (120; 220; 320 respectively). Signaling paths are also normally required between NSS (150; 250; 350 respectively) and LCE (130; 230; 330 respectively) and between BSS (140, 145; 240, 245; 340, 345 respectively) and LCE (130; 230; 330 respectively) in order to instigate location, return a location estimate to the client and enable LCE (130; 230; 330 respectively) to obtain relevant data when needed from NSS (150; 250; 350 respectively) or BSS (140, 145; 240, 245; 340, 345 respectively). With an overlay architectural solution, these signaling paths are supported either by facilities external to the wireless network or by existing facilities of the wireless network (e.g. short message service) whose usage for positioning determination is invisible to the wireless network. With an integrated architectural solution, the signaling paths are supported by facilities within the wireless network that are at least in part specially created to support positioning determination.

Figure 4:
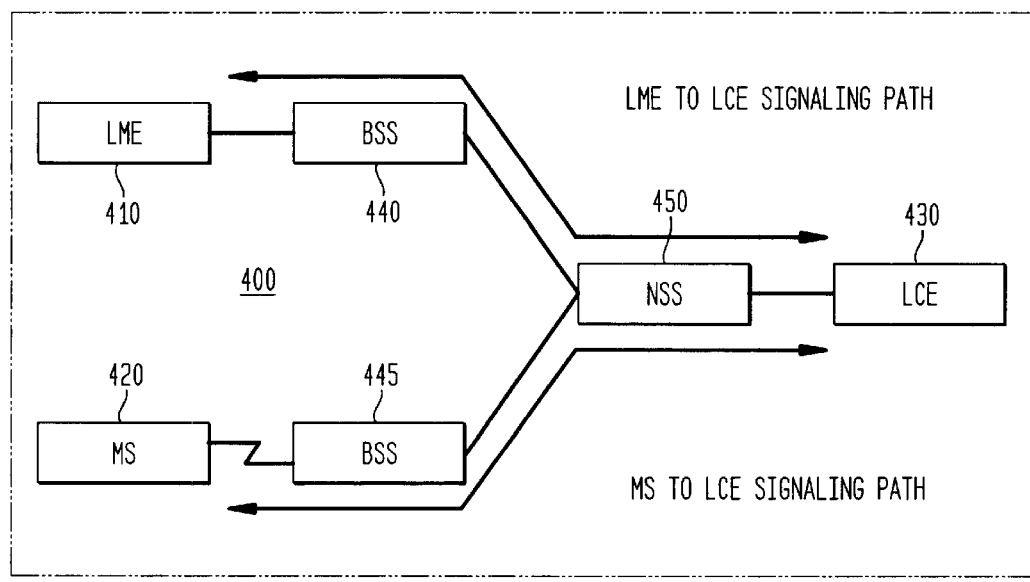
FIG. 4 is a diagram representing an example of an NSS-based location architecture.

With either an integrated or overlay solution, two types of architectural variant are utilized (e.g. defined in relevant standards for GSM, TDMA, CDMA IS-95). An architecture diagram 400 of one variant, an NSS solution, is shown in FIG. 4. Here LCE 430 is attached directly to NSS 450. With this variant, LME 410 to LCE 430 signaling (to transfer measurements from LME 410 to LCE 430) is supported by signaling facilities in both NSS 450 and BSS 440. LCE 430 to MS 420 signaling to support mobile based and mobile assisted position methods is supported by signaling facilities in both BSS 445 and NSS 450. In diagram 400, LME 410 and MS 420 are shown as associated with different BSSs 440 and 445, respectively. Those versed in the art will recognize that in some situations, BSSs 440 and 445 can be the same BSS. Similar merger of the different BSSs shown in the subsequently described diagrams 500, 600 and 700 is also possible.

Figure 5:
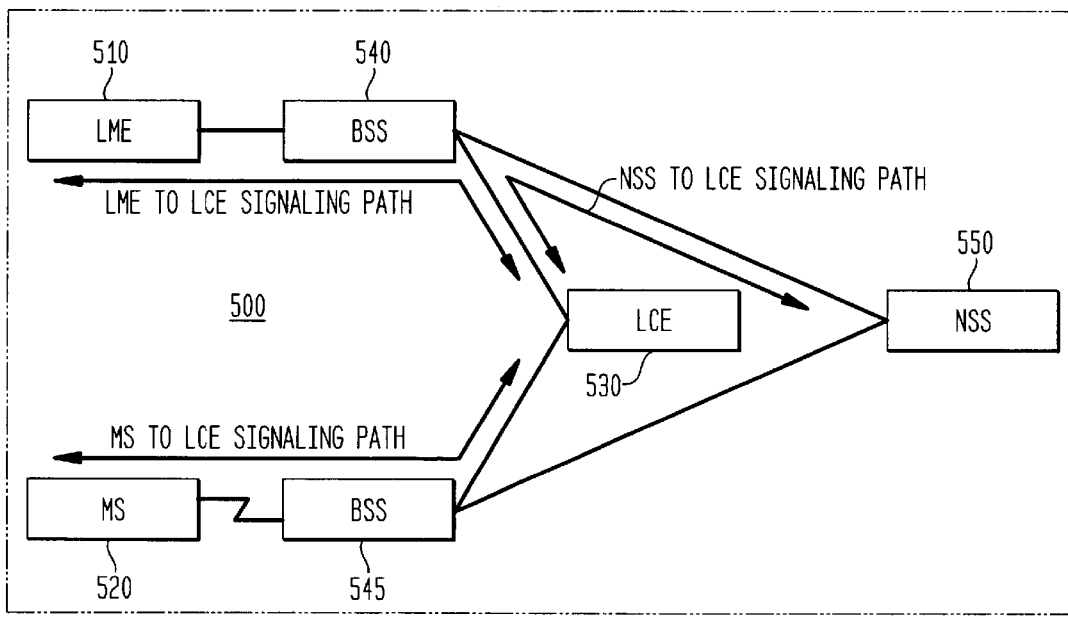
FIG. 5 is a diagram representing an example of a BSS-based location architecture.

An architecture diagram 500 of another variant, the BSS variant, is shown in FIG. 5. Here LCE 530 is attached directly to BSSs 540, 545. With this variant, LME 510 to LCE 530 signaling (to transfer measurements from LME 510 to LCE 530) and LCE 530 to MS 520 signaling (to support mobile based and mobile assisted position methods) are supported by signaling facilities in BSSs 540 and 545, respectively, and not by facilities in NSS 550. Access by NSS 550 to LCE 530 (e.g. to initiate a location procedure and receive the resulting location estimate) is supported by intermediate signaling facilities in BSSs 540 and/or 545 (e.g. to initiate location of MS 520, NSS 550 would normally use BSS 545 since this is the BSS currently serving MS 520). With this variant, signaling between LCE 530 and any one of MS 520, LME 510 or NSS 550 must pass through BSS 540 or BSS 545.

Figure 6:
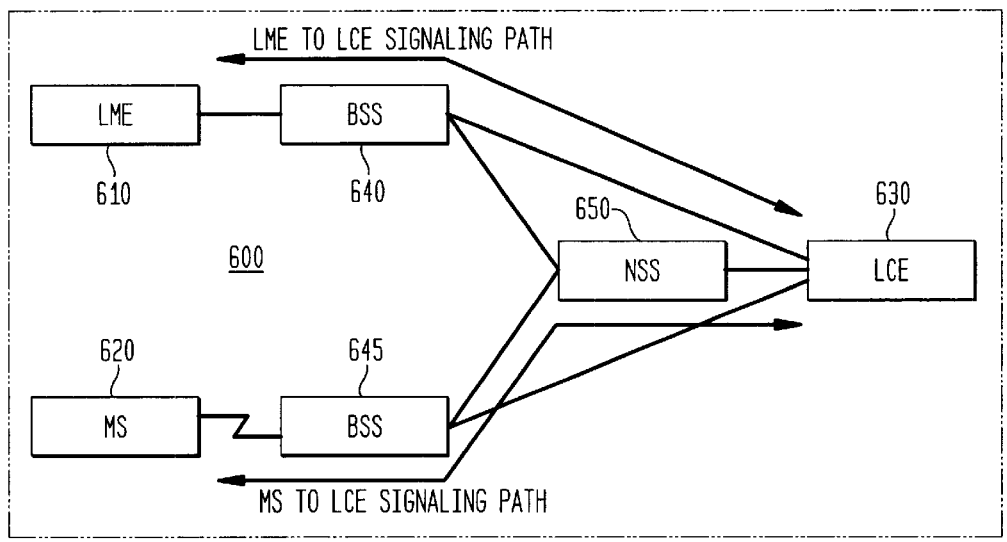
FIG. 6 is a diagram representing an example of a preferred embodiment for a hybrid location architecture.

With reference to FIG. 6, architecture diagram 600 illustrates the interaction of some components in a preferred embodiment of a "hybrid architecture" that provides support for location services with either an integrated or overlay location solution. At least one difference between a hybrid architecture and other architectures is that LCE 630 is connected to both NSS 650 and to BSS 640 and BSS 645.

In a preferred embodiment, LME 610 to LCE 630 signaling is supported by signaling facilities located in BSS 640 without the need to go through NSS 650, while MS 620 to LCE 630 signaling is supported by signaling facilities located in both NSS 650 and BSS 645. Since the NSS 650 has direct access to LCE 630, NSS 650 to LCE 630 signaling does not need facilities in BSSs 640, 645.

In a system implementing the hybrid architecture, LME 610 to LCE 630 signaling does not rely on signaling facilities in NSS 650. In a preferred embodiment MS 620 to LCE 630 signaling still relies on signaling facilities in BSS 645 and NSS 650; however the volume of such signaling will be substantially zero for network based positioning methods (where there is no MS 620 to LCE 630 signaling). With regard to MS based or MS assisted positioning support by the hybrid architecture, while there is additional signaling through NSS 650 to support MS 620 to LCE 630 signaling, in a preferred embodiment there is no extra signaling through BSS 640 or BSS 645 to enable access to LCE 630 from NSS 650. Software and/or hardware impacts in BSS 640 or BSS 645 are therefore not needed to support NSS 650 access to LCE 630.

The connectivity in the hybrid architecture shown in architecture diagram 600 suggests that communication between MS 620 and LCE 630 might be more efficiently supported by eliminating NSS 650 from the communications path and using only BSS 645. However, in a preferred embodiment NSS plays an important role in the hybrid architecture. When NSS 650 is eliminated from the MS 620 to LCE 630 communications path, LCE 630 would have to be told by NSS 650 (e.g. when NSS 650 first sends a location request for MS 620 to LCE 630) that communication between LCE 630 and MS 620 should be transferred through BSS 645 and not, for example, through BSS 640 or NSS 650. LCE 630 would also have to be provided with information from NSS 650 to identify to BSS 645 that the intended recipient of any communication sent by LCE 630 to MS 620 through BSS 645 is MS 620. MS 620 might have to provide similar information to BSS 645 related to LCE 630 when sending communication to BSS 645 for transfer to LCE 630. In addition, if MS 620 were to move to a new cell site controlled by another BSS (e.g. BSS 640), additional information might have to be provided by NSS 650 to LCE 630 to enable communication between LCE 630 and MS 620 via the new BSS. These additional requirements may complicate communication between LCE 630 and MS 620 and thus this method is not a part of the preferred embodiment hybrid architecture described previously, although it is allowed as a special variant in an alternative preferred embodiment. In the following description, the special variant hybrid architecture is not considered.

In a preferred embodiment, LCE 630 is an entity that is separate from both NSS 650 and BSSs 640 and 645, though in an alternative preferred embodiment LCE 630 is a logical function supported within an existing entity in NSS 650, BSS 640, or BSS 645.

In a preferred embodiment, LCE 630 to NSS 650 signaling is transparent to BSS 640 and BSS 645, while LCE 630 to BSS 640 or BSS 645 signaling is transparent to NSS 650. The signals from LCE 630 to NSS 650 either do not pass through BSS 640 or BSS 645 or do not require special support if they do pass through BSS 640 or BSS 645. Similarly, signals from LCE 630 to BSS 640 or BSS 645 either do not pass through NSS 650 or do not require special support if they do pass through NSS 650. For example, a physical 64 Kbit/sec channel that is routed through a circuit based switch (not shown) in BSS 640 or BSS 645 or NSS 650 would generally be transparent to that switch in terms of its usage to support a location service and thus would not count as special support. The same would be true of an X.25 connection or Signaling System 7 (SS7) Message Transfer Part (MTP) based association that was routed through a packet or message based switch in BSS 640 or BSS 645 or NSS 650 where the switch already existed and possessed the necessary X.25 or SS7 MTP switching capabilities to support services other than a location service. Signaling information that is routed through a switch in BSS 640 or BSS 645 or NSS 650 that required the switch to support any protocol or any capability not already needed for another service would not be considered transparent to the switch in the context of the description herein and would thus be considered as special support.

In a preferred embodiment, signals between LCE 630 and LME 610 only travel through BSS 640 and either do not travel through NSS 650 or travel transparently through NSS 650 with no special support. LCE 630 may have one or more signaling connections to each of BSS 640, 645.

In a preferred embodiment, signals between LCE 630 and MS 620 travel through both BSS 645 and NSS 650, while signals between LCE 630 and NSS 650 use a signaling connection between LCE 630 and NSS 650. LCE 630 may have one or more signaling connections to NSS 650.

Various embodiments of the invention are adapted for use with specific internal architectures of the NSS and BSS subsystems. For example, preferred embodiments may be used in conjunction with known Global System for Mobile Communications (GSM) systems and 3GPP (3$^{rd}$ Generation Partnership Project) WCDMA (Wideband Code Division Multiple Access) systems (which may be, for example, of the time division duplexing or frequency division duplexing variety), wherein the LCE corresponds to an entity known as a Serving Mobile Location Center (SMLC) that is resident in a GSM BSS or 3GPP WCDMA UTRAN (UMTS Terrestrial Radio Access Network). In these preferred embodiments, the LME corresponds to an entity known as a Location Measurement Unit (LMU) that may be either part of a GSM BSS or 3GPP UTRAN or a separate entity accessed via radio frequency signaling from a GSM BSS or 3GPP UTRAN in the same way as a normal MS. In currently standardized GSM and 3GPP WCDMA systems, the location service employs the BSS based variant. In order to transform these existing systems to conform to an alternative preferred embodiment of the hybrid architecture described herein, dedicated signaling connections could be added between the SMLC and certain switching entities in the NSS such as the MSC and SGSN. Such connections could be supported, for example, using dedicated physical links employing SS7, IP or X.25 based signaling between the SMLC and the MSC or SGSN. These would transport messages between the SMLC and the MSC or SGSN as well as relay messages through the MSC or SGSN between the SMLC and an MS. In a more radical transformation, the SMLC could be physically moved out of the BSS and into the NSS—e.g. by connection to an MSC and/or SGSN or integration within an MSC or SGSN. In this more radical case, additional signaling connections are implemented from the SMLC to major entities in the BSS like the GSM BSC or 3GPP WCDMA Radio Network Controller (RNC). In a preferred embodiment, these signaling connections are routed through existing entities (e.g. MSC, SGSN) and use existing transmission capabilities to allow usage to be transparent—e.g. by using 64 Kbit/sec circuit mode connections or SS7 MTP signaling.

Figure 7:
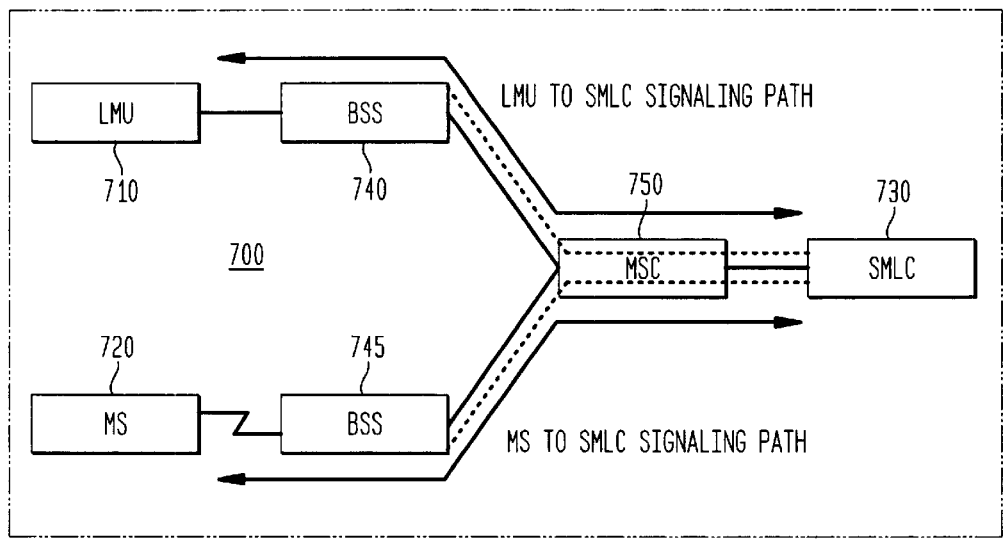
FIG. 7 is a diagram representing an example of a preferred embodiment for a hybrid location architecture used with a GSM system.

With reference to FIG. 7, architecture diagram 700 illustrates the interaction of some components in a preferred embodiment of a hybrid architecture used in conjunction with a GSM system. SMLC 730 exists as an entity separate from BSSs 740, 745, and is connected to MSC 750 by one or more 64 Kbit/sec signaling links. SMLC 730 is also indirectly connected to BSSs 740, 745. MSC 750 acts as an MTP Signaling Transfer Point (STP) to form the connection between SMLC 730 and each of BSS 740, 745, which connection is shown in FIG. 7 with dashed lines. BSSs 740, 745 can send location related messages to SMLC 730 by encapsulating each message inside an MTP message whose header contains the MTP signaling point code (SPC) of SMLC 730. When such a message is transmitted by BSS 740 or BSS 745, it is received first by MSC 750. The SPC of SMLC 730 inside the message then tells MSC 750 that the message is intended for SMLC 730. MSC 750 uses this information to send the message to the proper recipient, SMLC 730. Those familiar with the art will recognize this existing capability and appreciate that a similar process can be employed by SMLC 730 to send messages to BSS 740 or BSS 745. Since MSC 750 is acting only as an STP, it is not aware of and need not support the location-related signaling between SMLC 730 and BSS 740 or BSS 745.

Signaling between SMLC 730 and MS 720, which is compatible with GSM standards, can utilize a signal path through BSS 745 and MSC 750. The signaling can be made transparent to BSS 745 by employing message containers between MS 720 and MSC 750 that are already supported by BSS 745. In an alternative preferred embodiment, new message types can be created for both BSS 745 and MSC 750 that makes the SMLC 730 to MS 720 signaling visible to both MSC 750 and BSS 745.

Signaling between SMLC 730 and LMU 710 utilizes a signal path through BSS 740 and MSC 750. In a preferred embodiment, BSS 740 has been provided with dedicated MTP based signaling associations with SMLC 730 (using MSC 750 as STP) and the ensuing LMU 710 to SMLC 730 signaling is transparent to MSC 750. Thus, LMU 710 is supported in the same fashion as if SMLC 730 were solely BSS based while MS 720 is supported in the same fashion as if SMLC 730 were solely NSS based—resulting in a hybrid approach.

While the invention has been described in terms of preferred embodiments, those skilled in the art will recognize that the invention can be practiced with modification within the spirit and scope of the appended claims.

I claim:

1. A method for determining the geographic location of at least one wireless device, comprising:
   a) receiving a first set of location information at the at least one wireless device from a location computation entity, comprising:
      i) receiving at a network subsystem the first set of location information from the location computation entity;
      ii) sending from the network subsystem the first set of location information to a first base station subsystem; and
      iii) sending from the first base station subsystem the first set of location information to the at least one wireless device;
   b) sending a second set of location information, said second set of location information relating to the geographic location of the at least one wireless device, to the location computation entity, comprising:
      i) receiving at the first base station subsystem the second set of location information from the at least one wireless device;
      ii) sending from the first base station subsystem the second set of location information to the network subsystem; and
      iii) sending from the network subsystem the second set of location information to the location computation entity;
   c) receiving a third set of location information in at least one location measurement entity from the location computation entity, comprising:
      i) receiving at a second base station subsystem the third set of location information from the location computation entity; and
      ii) sending from the second base station subsystem the third set of location information to the at least one location measurement entity;
   d) sending a fourth set of location information to the location computation entity, comprising:
      i) receiving at the second base station subsystem the fourth set of location information from the at least one location measurement entity; and
      ii) sending from the second base station subsystem the fourth set of location information to the location computation entity; and
   e) processing the second set of location information, the fourth set of location information or the second and fourth sets of location information at the location computation entity to obtain the geographic location of the at least one wireless device.

2. The method of claim 1, wherein the first, second, third and fourth sets of location information may each be partitioned into two or more subsets of information sent at different times.

3. The method of claim 1, wherein the first, second, third and fourth sets of location information may each be null or non-null depending on the positioning method being used to locate the at least one wireless device.

4. The method of claim 1, wherein at least:
   a portion of the first set of location information is derived in the location computation entity from a portion of the fourth set of location information or
   a portion of the third set of location information is derived in the location computation entity from a portion of the second set of location information.

5. The method of claim 1, wherein the transfer of the first and second sets of location information between the network subsystem and the location computation entity is over a direct connection between the network subsystem and the location computation entity.

6. The method of claim 1, wherein the first and second sets of location information pass transparently through at least one of the first base station subsystem and the second base station subsystem.

7. The method of claim 1, wherein the transfer of the third and fourth sets of location information between the second base station subsystem and the location computation entity is over a direct connection between the second base station subsystem and the location computation entity.

8. The method of claim 1, wherein the transfer of the third and fourth sets of location information between the second base station subsystem and the location computation entity passes transparently through the network subsystem.

9. The method of claim 1, wherein the location computation entity is a GSM or WCDMA serving mobile location center (SMLC), the network subsystem is either a GSM or WCDMA mobile switching center (MSC) or a GSM or WCDMA serving GPRS support node (SGSN), the first and second base station subsystems are either GSM base station subsystems (BSSs) or WCDMA UMTS Terrestrial Radio Access Networks (UTRANs) and the location measurement entity is a GSM or WCDMA location measurement unit (LMU).

10. The method of claim 1, wherein the first and second base station subsystems are the same base station subsystem.

11. The method of claim 1, wherein there are multiple instances of the wireless device, first base station subsystem, second base station subsystem, location measurement entity and location computation entity.

12. A hybrid network for determining the geographic location of at least one wireless device comprising:
   a first base station subsystem connected to the at least one wireless device for sending a first set of location information to the at least one wireless device and receiving a second set of location information from the at least one wireless device, said second set of location information relating to the geographic location of the at least one wireless device;
   a network subsystem connected to the first base station subsystem for sending the first set of location information to the first base station subsystem and receiving the second set of location information from the first base station subsystem;
   at least one location measurement entity for receiving a third set of location information and generating a fourth set of location information;

a second base station subsystem connected to the at least one location measurement entity for sending the third set of location information to the at least one location measurement entity and receiving the fourth set of location information from the at least one location measurement entity; and a location computation entity connected to the network for i) generating the first set of location information and sending the first set of location information to the network subsystem; ii) receiving the second set of location information from the network subsystem; iii) generating the third set of location information and sending the third set of location information to the second based station subsystem; iv) receiving the fourth set of location information from the second base station subsystem; and v) processing the second set of location information, the fourth set of location information or the second and fourth sets of location information to obtain the geographic location of the at least one wireless device.

13. The hybrid network of claim 12, wherein the first, second, third and fourth sets of location information may each be partitioned into two or more subsets of information sent at different times.

14. The hybrid network of claim 12, wherein the first, second, third and fourth sets of location information may each be null or non-null depending on the positioning method being used to locate the at least one wireless device.

15. The hybrid network of claim 12, wherein the first set of location information is sent directly from the location computation entity to the network subsystem and the second set of location information is sent directly from the network subsystem to the location computation entity.

16. The hybrid network of claim 12, wherein the first and second sets of location information pass transparently through at least one of the first base station subsystem and the second base station subsystem.

17. The hybrid network of claim 12, wherein the third set of location information is sent directly from the location computation entity to the second base station subsystem and the fourth set of location information is sent directly from the second base station subsystem to the location computation entity.

18. The hybrid network of claim 12, wherein the transfer of the third and fourth sets of location information between the second base station subsystem and the location computation entity passes transparently through the network subsystem.

19. The hybrid network of claim 12, wherein the location computation entity is a GSM or WCDMA serving mobile location center (SMLC), the network subsystem is either a GSM or WCDMA mobile switching center (MSC) or a GSM or WCDMA serving GPRS support node (SGSN), the first and second base station subsystems are either GSM base station subsystems (BSSs) or WCDMA UMTS Terrestrial Radio Access Networks (UTRANs) and the location measurement entity is a GSM or WCDMA location measurement unit (LMU).

20. The hybrid network of claim 12, wherein the first and second base station subsystems are the same base station subsystem.

21. The hybrid network of claim 12, wherein there are multiple instances of the wireless device, first base station subsystem, second base station subsystem, location measurement entity and location computation entity.

* * * * *